(No Model.)
J. B. CROWNOVER.
FERTILIZER DISTRIBUTER.
No. 589,546. Patented Sept. 7, 1897.
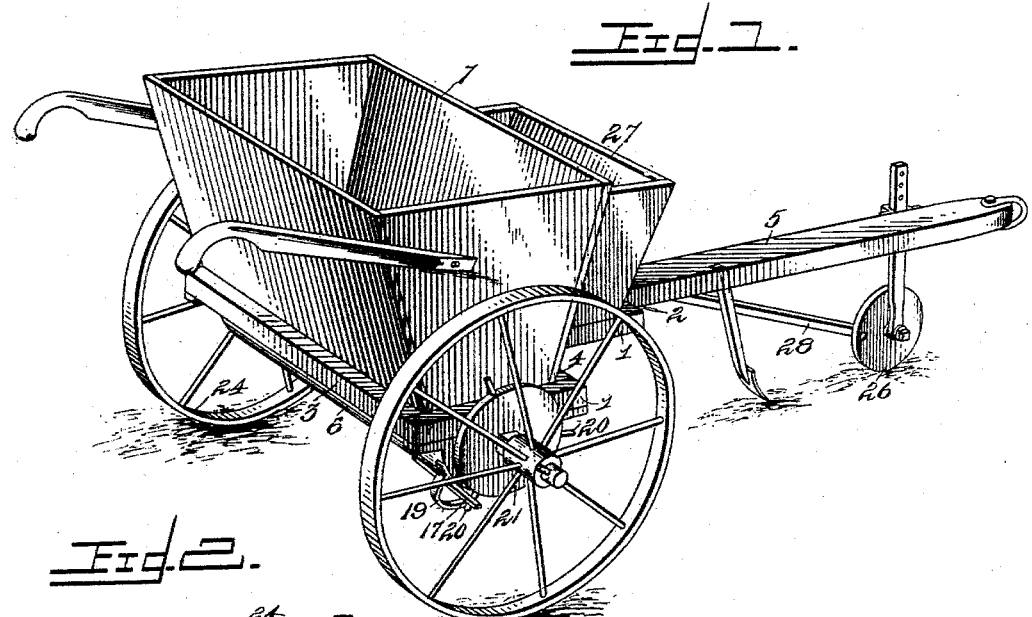
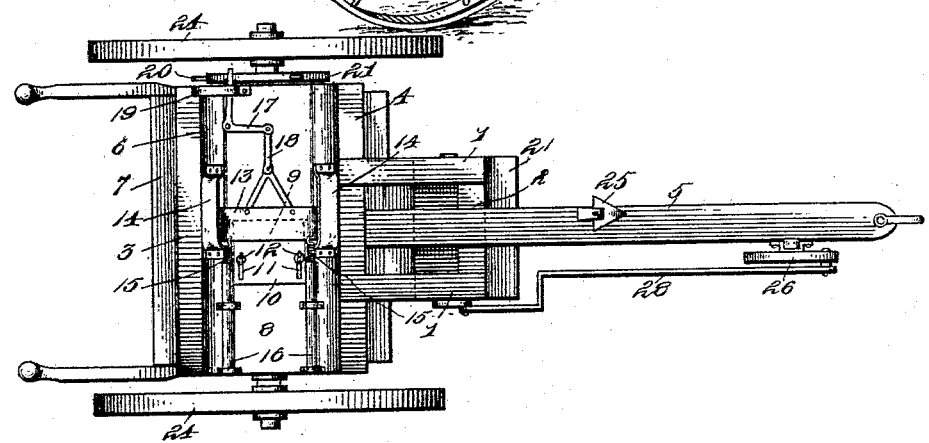
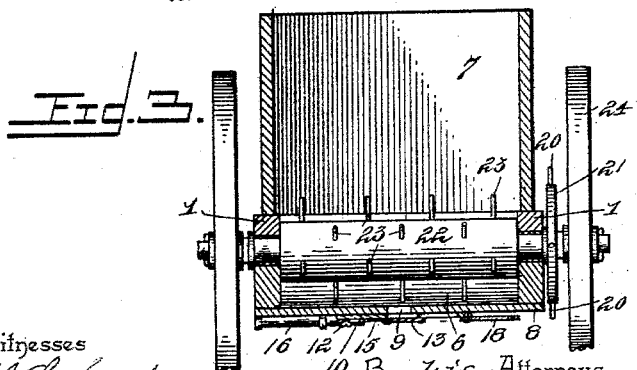
Witnesses
Inventor
John B. Crownover.
By his Attorneys,

UNITED STATES PATENT OFFICE.

JOHN B. CROWNOVER, OF MAXVILLE, ARKANSAS.

FERTILIZER-DISTRIBUTER.

SPECIFICATION forming part of Letters Patent No. 589,546, dated September 7, 1897.

Application filed October 6, 1896. Serial No. 608,018. (No model.)

*To all whom it may concern:*

Be it known that I, JOHN B. CROWNOVER, a citizen of the United States, residing at Maxville, in the county of Sharp and State of Arkansas, have invented a new and useful Fertilizer-Distributer, of which the following is a specification.

My invention relates to fertilizer-distributers, and has for its object to provide a distributer so constructed as to adapt it for use as a cotton or corn planter or for use in connection with seed-planting devices, the same being of simple construction and being provided with means for controlling the rapidity of feed.

Further objects and advantages of this invention will appear in the following description, and the novel features thereof will be particularly pointed out in the appended claim.

In the drawings, Figure 1 is a perspective view of a machine constructed in accordance with my invention. Fig. 2 is a bottom plan view of the same. Fig. 3 is a transverse section taken in the plane of the agitator-shaft.

Similar numerals of reference indicate corresponding parts in all the figures of the drawings.

The frame of the machine embodying my invention comprises side bars 1, connected by front and rear cross-bars 2 and 3 and an intermediate cross-bar 4, the tongue 5 being attached to the front and intermediate cross-bars. Arranged between and supported by the rear and intermediate cross-bars is a receptacle 6 for fertilizer, cotton, corn, or other material to be distributed or drilled, and supported by the frame in communication with the receptacle is a hopper 7, said receptacle having the center of its bottom flattened, as shown at 8, and being provided at an intermediate point with a feed-opening 9.

An adjustable cut-off 10 is arranged in operative relation with the feed-opening to vary the size thereof, said cut-off consisting of a plate slotted, as shown at 11, and held in place by means of set-screws 12.

The seed-slide 13, which is adapted to be operated at intervals to drop the material to be planted in drills, is fitted terminally in guides 14, secured to the under side of the receptacle, and is normally held in its closed position by means of contractile springs 15, arranged in tubular sheaths 16. The slide is connected with a bell-crank operating-lever 17 by means of a loose or swinging link 18, the outer arm of said bell-crank lever extending through a guide 19 and being arranged in the path of actuating pins or studs 20 on an operating-disk 21, said disk being secured to and carried by an agitator-shaft 22, which extends through the receptacle. This agitator-shaft carries agitator-arms 23, which operate in the plane of the feed-opening, and the agitator-shaft preferably consists of an axle to which are attached the ground-wheels 24.

Arranged in advance of the receptacle and in alinement with the feed-opening thereof is a plow-blade 25, and in advance thereof is a gage-wheel or colter 26 for regulating the depth at which the plow-blade operates.

In Fig. 1 I have shown a seedbox 27 arranged upon the frame in front of the hopper, the same being adapted to receive motion from the gage-wheel or colter through the pitman 28. This portion of the apparatus may or may not be used, as required, its object being to plant grain or other seed, while the receptacle 6 is adapted to contain fertilizer.

Various changes in the form, proportion, and the minor details of construction may be resorted to without departing from the spirit or sacrificing any of the advantages of this invention.

Having described my invention, what I claim is—

In a machine of the class described, the combination with a frame, ground-wheels, of a receptacle having a feed-opening, a shaft extending through the receptacle and operatively connected with the ground-wheels, said shaft carrying agitator-arms, a spring return-slide for controlling the feed-opening, a lever operatively connected with the slide, and a disk having radial pins to engage the other arm of said lever, the disk being carried by said shaft, substantially as specified.

In testimony that I claim the foregoing as my own I have hereto affixed my signature in the presence of two witnesses.

JNO. B. CROWNOVER.

Witnesses:
JAMES A. LAMAN,
JOHN J. WILSON.